United States Patent
Moussakhani

(10) Patent No.: US 10,551,972 B2
(45) Date of Patent: Feb. 4, 2020

(54) INTERACTIVE PROJECTOR AND METHOD OF CONTROLLING INTERACTIVE PROJECTOR

(71) Applicant: Seiko Epson Corporation, Tokyo (JP)

(72) Inventor: Babak Moussakhani, Trondheim (NO)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/079,035

(22) Filed: Mar. 23, 2016

(65) Prior Publication Data

US 2016/0282961 A1 Sep. 29, 2016

(30) Foreign Application Priority Data

Mar. 27, 2015 (JP) .................................. 2015-065627

(51) Int. Cl.
 *G06F 3/042* (2006.01)
(52) U.S. Cl.
 CPC .................. *G06F 3/0425* (2013.01)
(58) Field of Classification Search
 CPC . G06F 3/03545; G06F 3/0425; H04N 9/3185; H04N 9/3194
 See application file for complete search history.

(56) References Cited

U.S. PATENT DOCUMENTS

| 8,436,836 | B2 | 5/2013 | Njolstad et al. | |
| 2007/0291850 | A1* | 12/2007 | Ishikawa | H04N 21/21805 375/240.24 |
| 2009/0257659 | A1* | 10/2009 | Suzuki | B60R 1/00 382/199 |
| 2011/0205186 | A1* | 8/2011 | Newton | G06F 3/011 345/175 |
| 2015/0317037 | A1* | 11/2015 | Suzuki | G06F 3/0426 345/175 |

FOREIGN PATENT DOCUMENTS

| JP | 2008-520034 A | 6/2008 |
| JP | 2012-150636 A | 8/2012 |
| JP | 2014-067349 A | 4/2014 |
| JP | 2016-170709 A | 9/2016 |
| JP | 2016170709 | * 9/2016 |

* cited by examiner

*Primary Examiner* — Kenneth Bukowski
(74) *Attorney, Agent, or Firm* — ALG Intellectual Property, LLC

(57) ABSTRACT

An interactive projector includes a projection section, a plurality of cameras including a first camera and a second camera, a position detection section adapted to detect a first coordinate position of the pointing element on the projected screen based on a first taken image including the pointing element taken by the first camera, and detect a second coordinate position of the pointing element on the projected screen based on a second taken image including the pointing element taken by the second camera, and a contact detection section adapted to detect contact of the pointing element with the projected screen based on the first coordinate position and the second coordinate position, and the contact detection section detects the contact of the pointing element with the projected screen in a case in which the first coordinate position and the second coordinate position coincide with each other within an allowable tolerance.

4 Claims, 8 Drawing Sheets

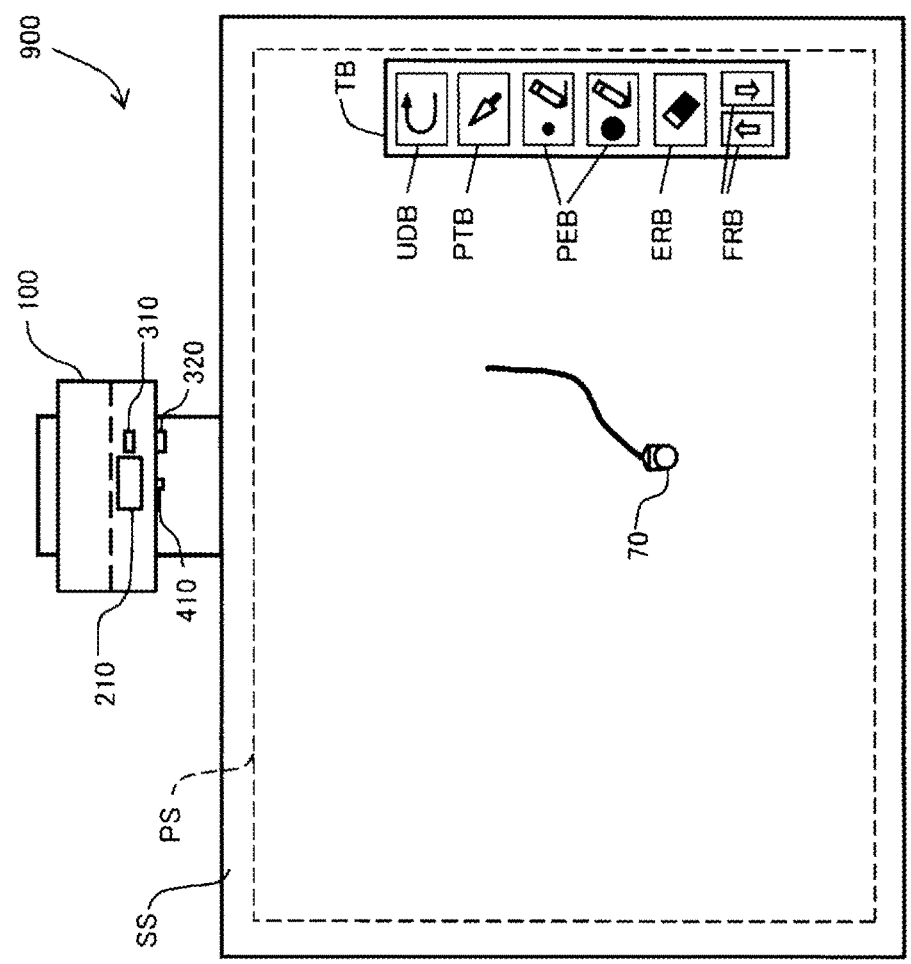
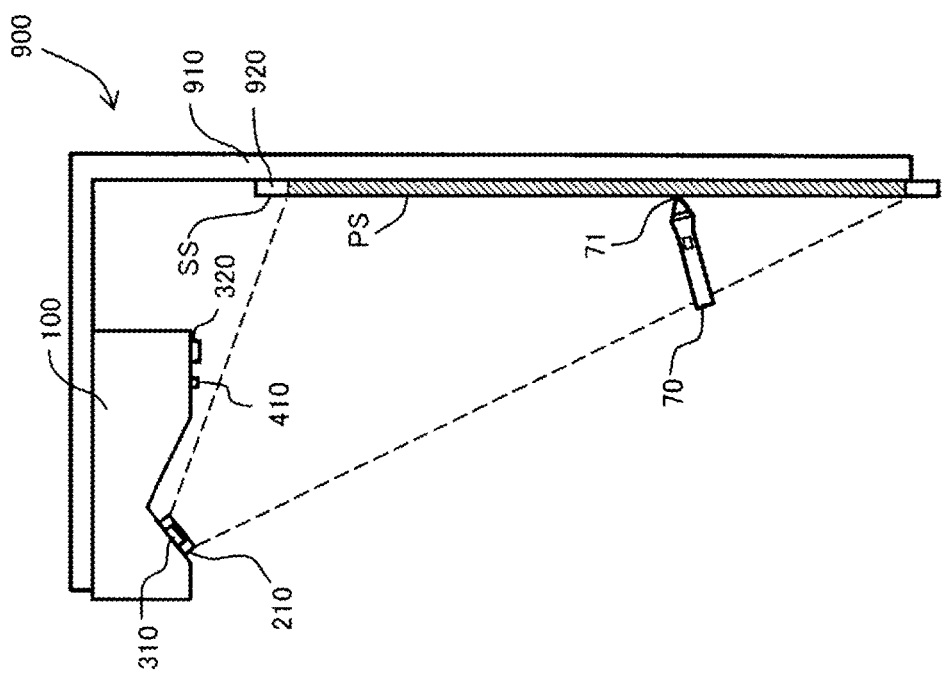

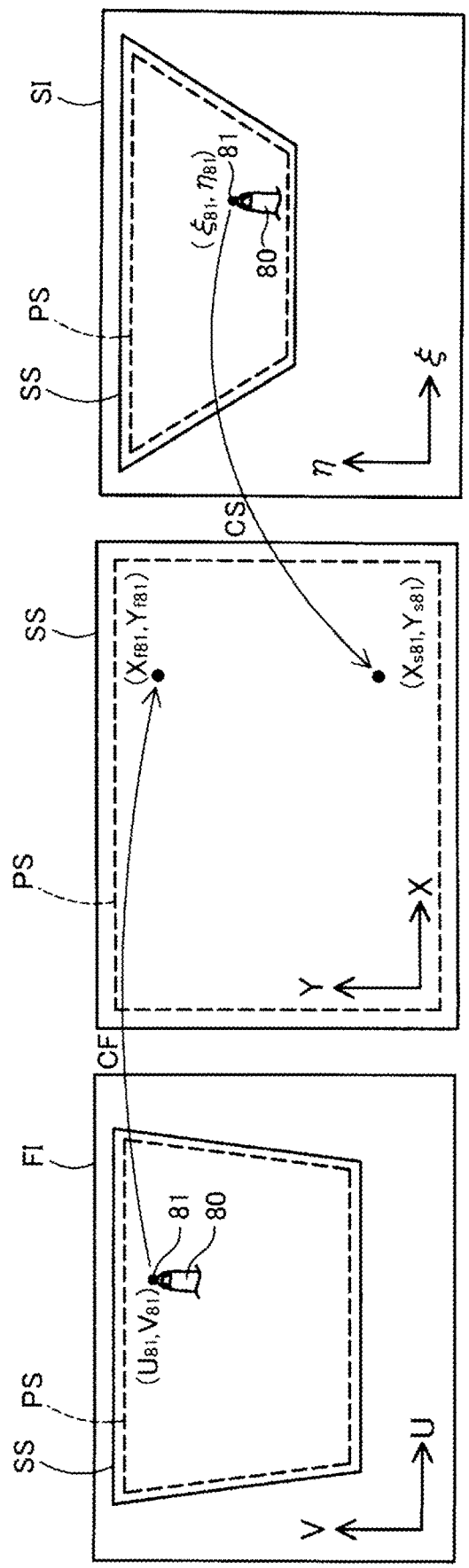

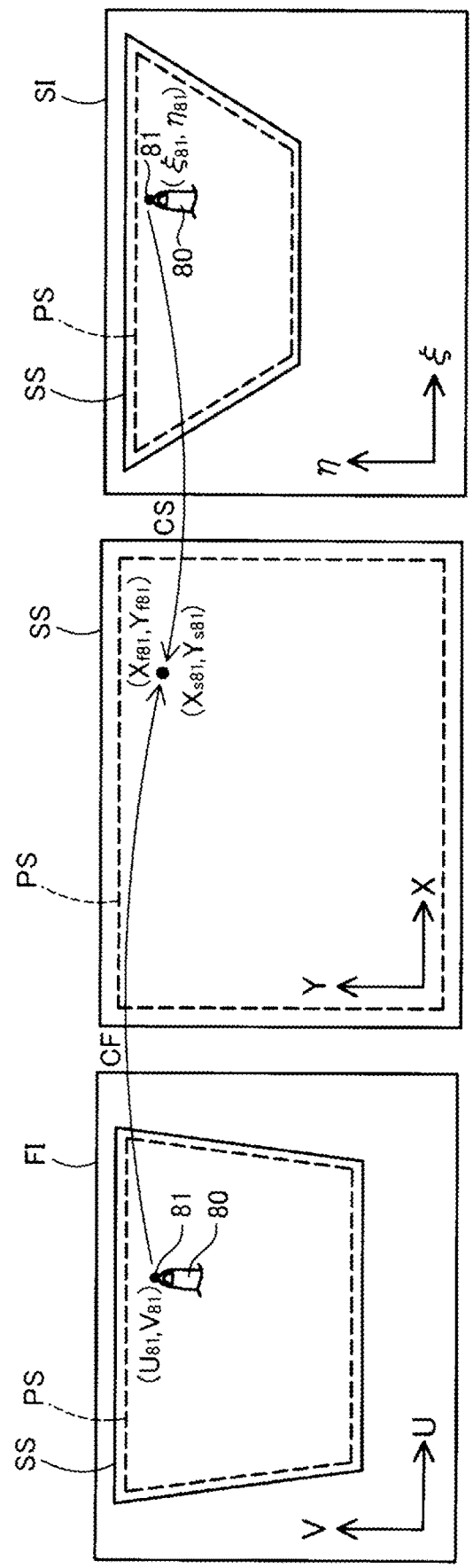

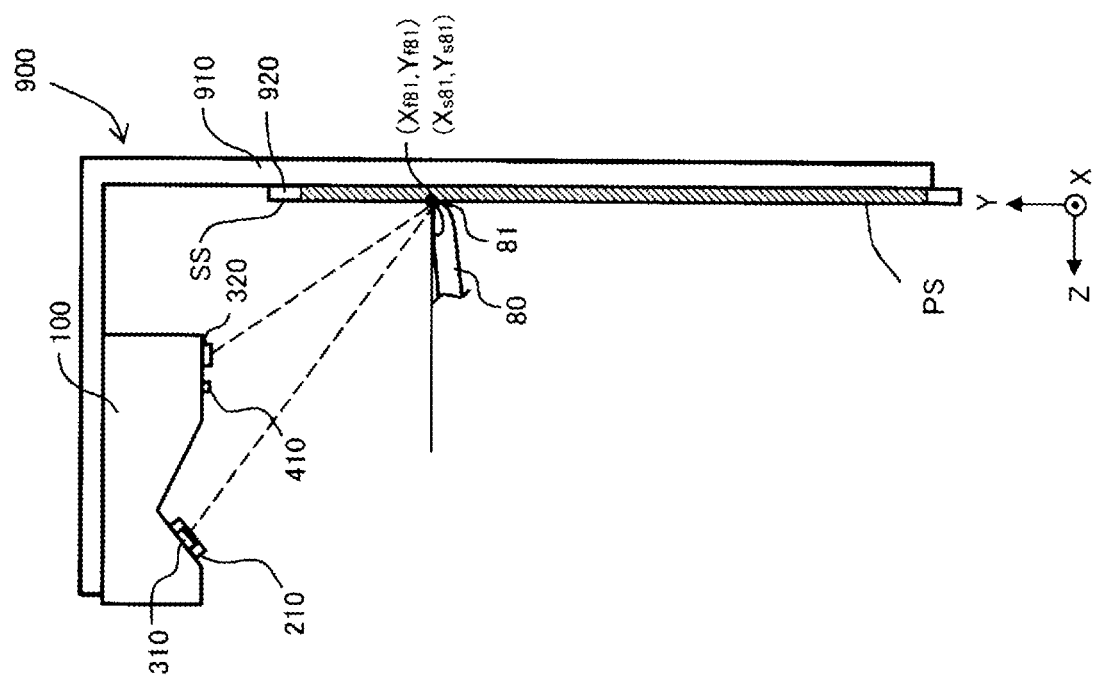
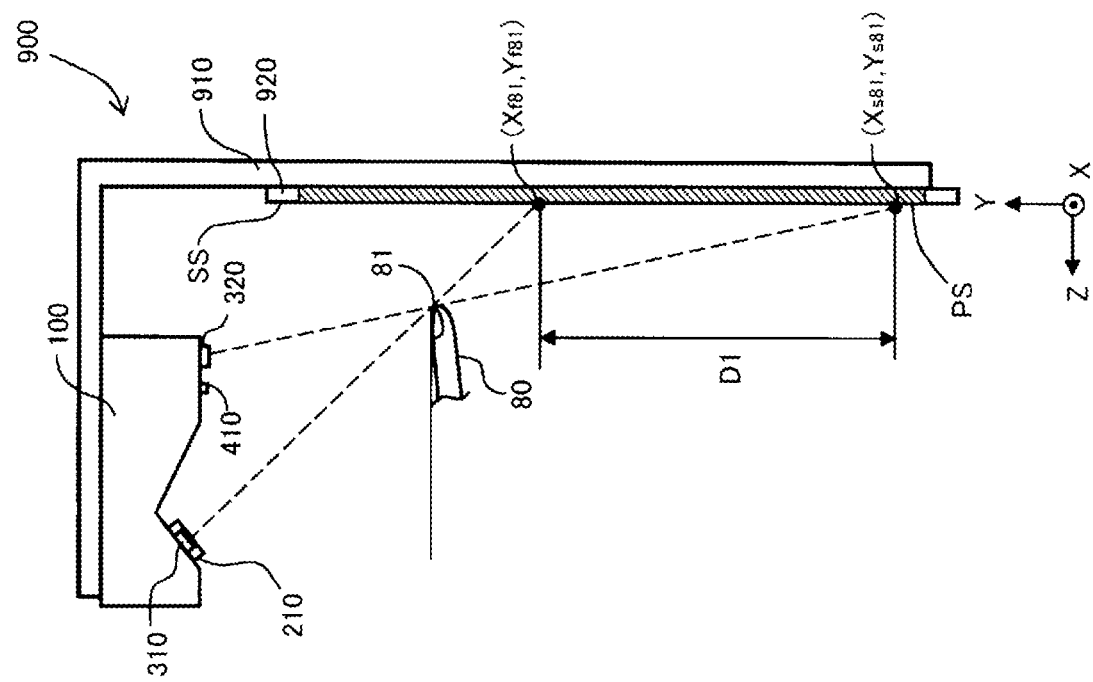

INTERACTIVE PROJECTOR AND METHOD OF CONTROLLING INTERACTIVE PROJECTOR

The entire disclosure of Japanese Patent Application No. 2015-065627, filed Mar. 27, 2015 is expressly incorporated by reference herein.

BACKGROUND

1. Technical Field

The present invention relates to an interactive projector capable of receiving an instruction of the user to a projected screen with a pointing element, and a method of controlling the projector.

2. Related Art

JP-A-2012-150636 and JP-T-2008-520034 disclose a projection display device (projector) capable of projecting a projected screen on a screen, and at the same time taking an image, which includes an object such as a finger or a light emitting pen, with a camera to detect the position of the object using the taken image. An object such as a finger is used as a pointing element for making an instruction to the projection image. In other words, when the tip of the object has contact with the screen, the projector recognizes that a predetermined instruction such as drawing is input with respect to the projected screen, and then redraws the projected screen in accordance with the instruction. Therefore, it is possible for the user to input a variety of instructions using the projected screen as a user interface. The projector of the type capable of using the projected screen on the screen as an inputting user interface as described above is referred to as an "interactive projector." Further, the object used for making an instruction to the projected screen is referred to as a "pointing element."

In the typical interactive projector, whether or not an instruction is made using the pointing element is determined in accordance with whether or not the tip of the pointing element has contact with the screen. The contact of the pointing element can be detected based on the distance between the tip of the pointing element and the screen. However, there has been a problem that the projector, which detects the three-dimensional position of the tip of the pointing element using a plurality of cameras in order to calculate the distance between the tip of the pointing element and the screen, takes time to calculate the three-dimensional position, or fails to obtain sufficient detection accuracy. Therefore, there has been demanded a technology of performing the detection process on whether or not the pointing element has contact with the screen in a nontraditional way.

SUMMARY

An advantage of some aspects of the invention is to solve at least a part of the problems described above, and the invention can be implemented as the following aspects or application examples.

(1) An aspect of the invention provides an interactive projector capable of receiving an instruction of a user to a projected screen with a pointing element. The interactive projector includes a projection section adapted to project the projected screen on a screen surface, a plurality of cameras including a first camera and a second camera each adapted to take an image of an area of the projected screen, a position detection section adapted to detect a first coordinate position of the pointing element on the projected screen based on a first taken image including the pointing element taken by the first camera, and detect a second coordinate position of the pointing element on the projected screen based on a second taken image including the pointing element taken by the second camera, and a contact detection section adapted to detect contact of the pointing element with the projected screen based on the first coordinate position and the second coordinate position, and the contact detection section detects the contact of the pointing element with the projected screen in a case in which the first coordinate position and the second coordinate position coincide with each other within an allowable tolerance.

In this interactive projector, the first coordinate position and the second coordinate position of the pointing element on the projected screen are detected using the first camera and the second camera. Since the detection of the contact of the pointing element with the projected screen is performed based on whether or not the first coordinate position and the second coordinate position roughly coincide with each other, the detection processing on whether or not the pointing element has contact with the screen can easily be performed using an alternative method.

(2) In the interactive projector described above, the position detection section may include first correspondence data having a two-dimensional coordinate position of the pointing element in the first taken image and a two-dimensional coordinate position of the pointing element on the projected screen in a case in which the pointing element has contact with the projected screen made to correspond to each other, and second correspondence data having a two-dimensional coordinate position of the pointing element in the second taken image and a two-dimensional coordinate position of the pointing element on the projected screen in the case in which the pointing element has contact with the projected screen made to correspond to each other, detect the first coordinate position from the first taken image using the first correspondence data, and detect the second coordinate position from the second taken image using the second correspondence data.

According to this configuration, the first coordinate position and the second coordinate position of the pointing element on the projected screen can easily be detected using the first correspondence data and the second correspondence data.

(3) In the interactive projector described above, the first coordinate position may be a coordinate position of an intersection between a straight line connecting the first camera and the pointing element to each other and the projected screen, and the second coordinate position may be a coordinate position of an intersection between a straight line connecting the second camera and the pointing element to each other and the projected screen.

According to this configuration, since the first coordinate position and the second coordinate position of the pointing element coincide with each other on the projected screen if the pointing element has contact with the projected screen, whether or not the pointing element has contact with the screen can easily be detected.

The invention can be implemented as a variety of configurations such as, for example, a system provided with the pointing element including at least either one of the light-emitting pointing element and the non-light-emitting pointing element, the screen, and the interactive projector, a control method or a control device of the interactive projector, a computer program for implementing the method or the functions of the device, or a non-transitory storage medium on which the computer program is recorded.

BRIEF DESCRIPTION OF THE DRAWINGS

The invention will be described with reference to the accompanying drawings, wherein like numbers reference like elements.

FIGS. 2A and 2B are a side view and a front view of the interactive projection system, respectively.

FIGS. 5A through 5C are first diagrams showing an example of the correspondence relationship between a taken image and the projected screen.

FIGS. 6A through 6C are second diagrams showing an example of the correspondence relationship between the taken image and the projected screen.

FIGS. 7A and 7B are diagrams showing an example of the tip portion of the non-light-emitting pointing element and a screen surface.

DESCRIPTION OF AN EXEMPLARY EMBODIMENT

A1. General Description of System

Figure 1:
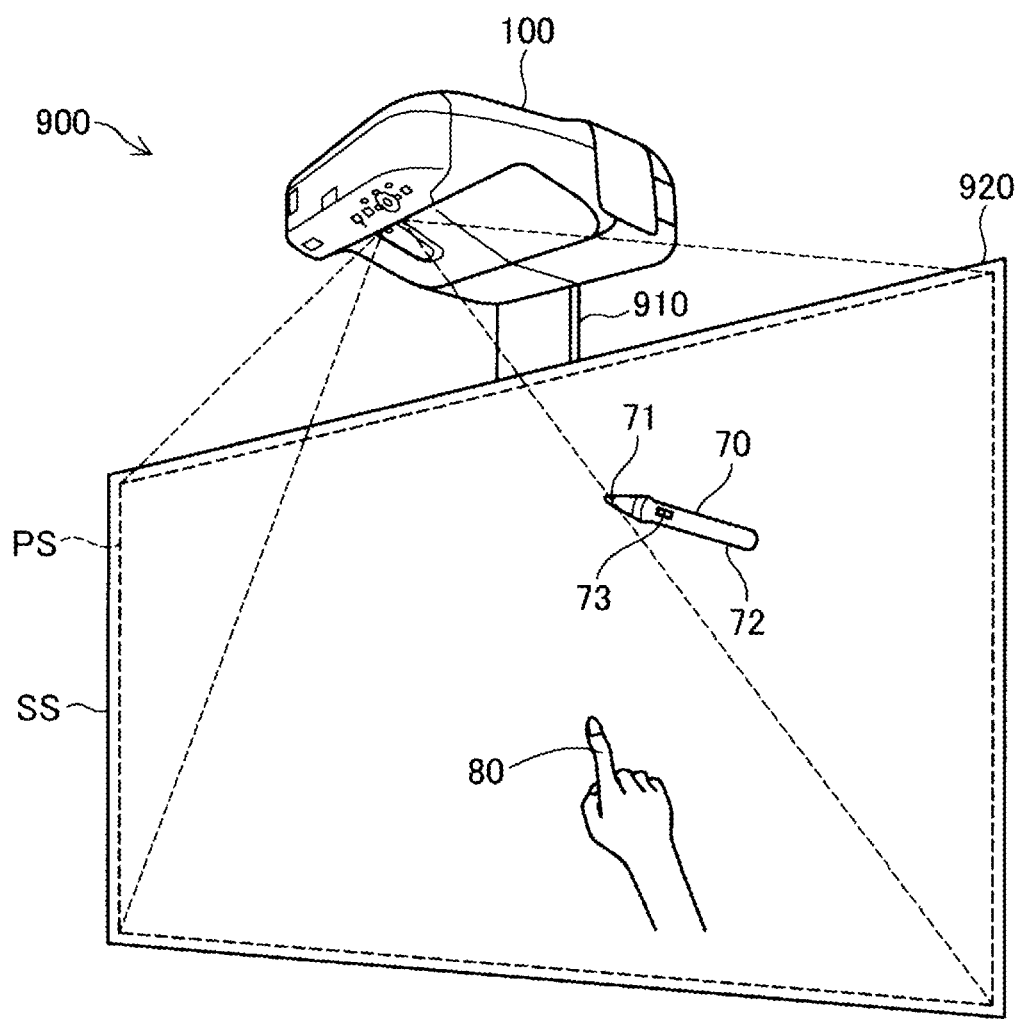
FIG. 1 is a perspective view of an interactive projection system.

FIG. 1 is a perspective view of an interactive projection system 900 according to an embodiment of the invention. The system 900 has an interactive projector 100, a screen plate 920, and a light-emitting pointing element 70. The front surface of the screen plate 920 is used as a projection screen surface SS. The projector 100 is fixed in front of and above the screen plate 920 with a support member 910. It should be noted that although the projection screen surface SS is vertically disposed in FIG. 1, it is also possible to use the system 900 with the projection screen surface SS disposed horizontally.

The projector 100 projects a projected screen PS on the projection screen surface SS. The projected screen PS normally includes an image drawn in the projector 100. In the case in which the image drawn in the projector 100 does not exist, the projector 100 irradiates the projected screen PS with light to display a white image. In the present specification, the "projection screen surface SS" (or a "screen surface SS") denotes a surface of a member on which the image is projected. Further, the "projected screen PS" denotes an area of an image projected on the projection screen surface SS by the projector 100. Normally, the projected screen PS is projected on a part of the projection screen surface SS.

The light-emitting pointing element 70 is a pen-shaped pointing element having a tip portion 71 capable of emitting light, a sleeve section 72 held by the user, and a button switch 73 provided to the sleeve section 72. The configuration and the function of the light-emitting pointing element 70 will be described later. In the system 900, one or more non-light-emitting pointing elements 80 (e.g., a non-light-emitting pen or a finger) can be used together with one or more light-emitting pointing elements 70. Hereinafter, the light-emitting pointing element 70 and the non-light-emitting pointing element 80 are also referred to simply as a pointing element 780 if not discriminated from each other.

FIG. 2A is a side view of the interactive projection system. 900, and FIG. 2B is a front view thereof. In the present specification, a direction along a horizontal direction of the screen surface SS is defined as an X direction, a direction along a vertical direction of the screen surface SS is defined as a Y direction, and a direction along a normal line of the screen surface SS is defined as a Z direction. It should be noted that the X direction is also referred to as a "horizontal direction," the Y direction is also referred to as a "vertical direction," and the Z direction is also referred to as an "anteroposterior direction" for the sake of convenience. Further, among directions along the Y direction (the vertical direction), the direction in which the projected screen PS is located viewed from the projector 100 is referred to as a "downward direction." It should be noted that in FIG. 2A, the range of the projected screen PS out of the screen plate 920 is provided with hatching for the sake of convenience of graphical description.

The projector 100 includes a projection lens 210 for projecting the projected screen PS on the screen surface SS, a first camera 310 and a second camera 320 each for taking an image of the area of the projected screen PS, and a detection light irradiation section 410 for illuminating the pointing element 780 with the detection light. As the detection light, near infrared light, for example, is used. The two cameras 310, 320 each have at least a first imaging function for receiving light in a wavelength region, which includes the wavelength of the detection light, to perform imaging. The two cameras 310, 320 are each further provided with a second imaging function for receiving light including visible light to perform imaging, and are each configured so as to be able to switch between these two imaging functions. For example, it is preferable for each of the two cameras 310, 320 to be provided with a near infrared filter switching mechanism (not shown) capable of placing a near infrared filter, which blocks visible light and transmits only the near infrared light, in front of a lens and retracting the near infrared filter from the front of the lens. The two cameras 310, 320 are the same in the horizontal (the X direction) position, and are arranged side by side with a predetermined distance in the anteroposterior direction (the Z direction). The two cameras 310, 320 are not limited to those in the present embodiment. For example, it is also possible for the two cameras 310, 320 to be the same in the anteroposterior (the Z direction) position, and arranged side by side with a predetermined distance in the horizontal direction (the X direction). Further, it is also possible for the two cameras 310, 320 to be different in position in all of the X, Y, and Z directions, respectively.

The example shown in FIG. 2B shows the state in which the interactive projection system 900 acts in a whiteboard mode. The whiteboard mode is a mode in which the user can arbitrarily draw a picture on the projected screen PS using the light-emitting pointing element 70 or the non-light-emitting pointing element 80. The projected screen PS including a toolbox TB is projected on the screen surface SS. The toolbox TB includes a cancel button UDB for undoing the process, a pointer button PTB for selecting a mouse pointer, a pen button PEB for selecting the pen tool for drawing an image, an eraser button ERB for selecting an eraser tool for erasing the image having been drawn, and forward/backward button FRB for feeding the screen forward or backward. By touching these buttons using the pointing element, the user can perform processes corresponding to the respective buttons, or can select tools corresponding to the respective buttons. It should be noted that it is also possible to arrange that the mouse pointer is selected as a default tool immediately after starting up the system 900. In the example shown in FIG. 2B, there is described the appearance in which a line is being drawn in the projected screen PS by the user selecting the pen tool, and then moving the tip portion 71 of the light-emitting pointing element 70 within the projected screen PS in the state of having contact with the screen surface SS. The drawing of the line is performed by a projection image generation section (described later) inside the projector 100.

It should be noted that the interactive projection system 900 can act in other modes than the whiteboard mode. For example, this system 900 can also act in a PC interactive mode for displaying an image of the data, which has been transferred from a personal computer (not shown) via a communication line, on the projected screen PS. In the PC interactive mode, an image of the data of, for example, spreadsheet software is displayed, and it becomes possible to perform input, generation, correction, and so on of the data using a variety of tools and icons displayed in the image.

Figure 3:
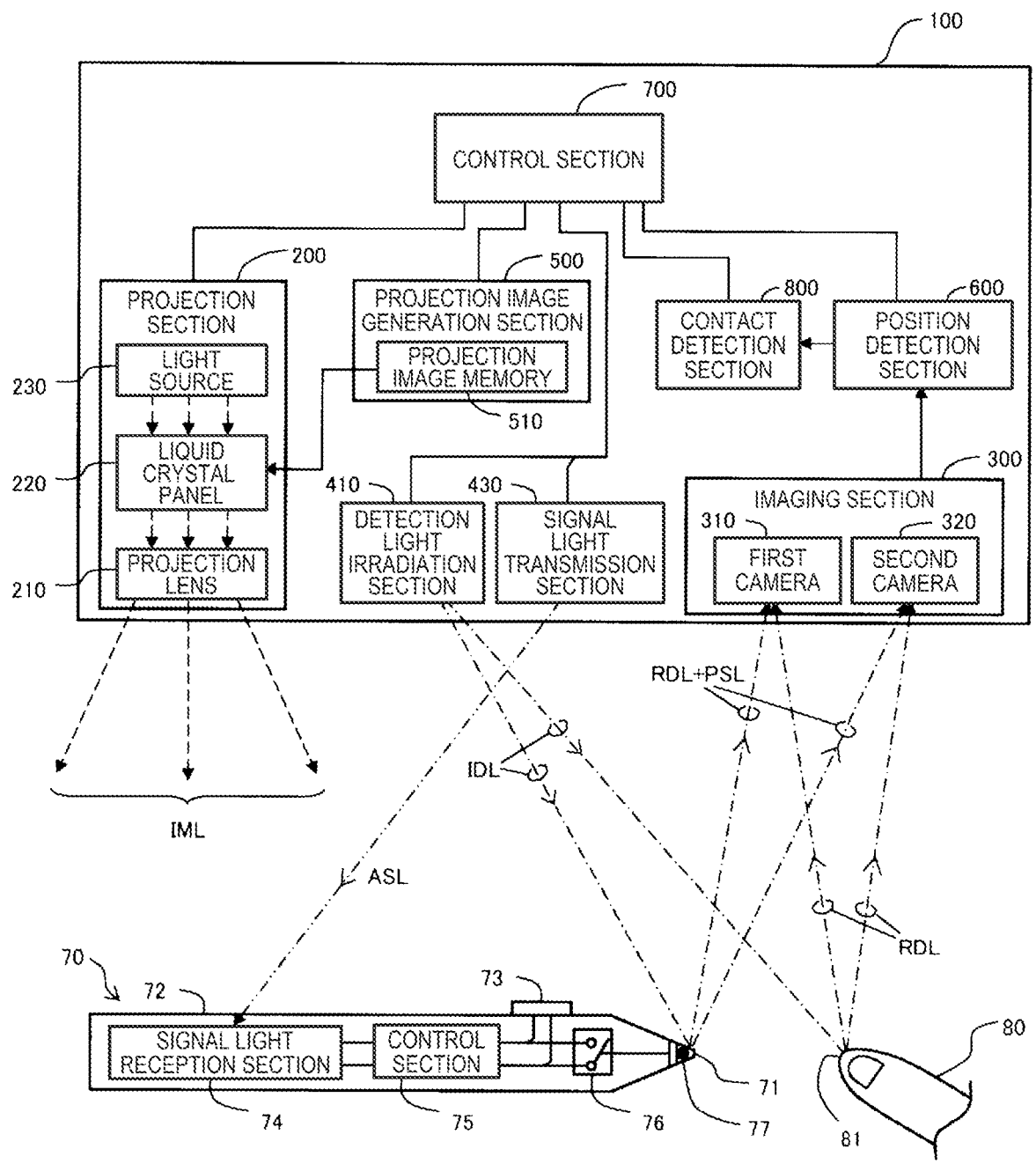
FIG. 3 is a block diagram showing an internal configuration of a projector and a light-emitting pointing element.

FIG. 3 is a block diagram showing the internal configuration of the interactive projector 100 and the light-emitting pointing element 70. The projector 100 has a control section 700, a projection section 200, a projection image generation section 500, a position detection section 600, a contact detection section 800, an imaging section 300, a detection light irradiation section 410, and a signal light transmission section 430.

The control section 700 performs the control of each of the sections inside the projector 100. Further, the control section 700 determines the content of the instruction performed on the projected screen PS by the pointing element 780 based on the coordinate position of the pointing element 780 in the projected screen PS detected by the position detection section 600 and the contact detection of the pointing element 780 with the projected screen PS by the contact detection section 800, and at the same time commands the projection image generation section 500 to generate or change the projection image in accordance with the content of the instruction.

The projection image generation section 500 has a projection image memory 510 for storing the projection image, and has a function of generating the projection image to be projected on the screen surface SS by the projection section 200. It is preferable for the projection image generation section 500 to be further provided with a function as a keystone distortion correction section for correcting a keystone distortion of the projected screen PS (FIG. 2B).

The projection section 200 has a function of projecting the projection image, which has been generated by the projection image generation section 500, on the screen surface SS. The projection section 200 has a liquid crystal panel 220 and a light source 230 besides the projection lens 210 explained with reference to FIGS. 2A and 2B. The liquid crystal panel 220 is a light modulation device for modulating the light from the light source 230 in accordance with the projection image data provided from the projection image memory 510 to thereby form projection image light IML. The projection image light IML is typically color image light including the visible light of three colors of RGB, and is projected on the screen surface SS by the projection lens 210. It should be noted that as the light source 230, there can be adopted a variety of light source such as a light emitting diode or a laser diode, or the light source lamp such as a super-high pressure mercury lamp. Further, as the liquid crystal panel 220, there can be adopted either of the transmissive type and the reflective type, or a plurality of liquid crystal panels 220 corresponding respectively to the colored light beams may be provided. Further, it is also possible to adopt other light modulation devices such as a digital mirror device instead of the liquid crystal panel 220.

The detection light irradiation section 410 irradiates throughout the screen surface SS and the space in front of the screen surface SS with irradiating detection light IDL for detecting the tip portion of the pointing element 780. As the irradiating detection light IDL, near infrared light, for example, is used. The detection light irradiation section 410 is put on only in a predetermined period including imaging timing of the cameras 310, 320, and is put off in other periods. Alternatively, it is also possible to arrange that the detection light irradiation section 410 is always kept in the lighting state while the system 900 is in action.

The signal light transmission section 430 has a function of transmitting device signal light ASL as a near infrared signal used for synchronization. The device signal light ASL is the near infrared signal for synchronization, and is periodically emitted by the signal light transmission section 430 to the light-emitting pointing element 70 when the projector 100 is started up. A tip light emitting section 77 of the light-emitting pointing element 70 emits pointing element signal light PSL (described later) as the near infrared light having a predetermined light emission pattern (light emission sequence) in sync with the device signal light ASL. Further, when performing the position detection of the pointing element 780, the cameras 310, 320 of the imaging section 300 perform imaging at predetermined timings synchronized with the device signal light ASL.

The imaging section 300 has the first camera 310 and the second camera 320 explained with reference to FIGS. 2A and 2B. As described above, the two cameras 310, 320 each have the function of receiving light in the wavelength region including the wavelength of the detection light to thereby perform imaging. In the example shown in FIG. 3, there is described the appearance in which the irradiating detection light IDL emitted by the detection light irradiation section 410 is reflected by the pointing element 780, and then the reflected detection light RDL is received by the two cameras 310, 320 to be imaged. The two cameras 310, 320 further receive the pointing element signal light PSL, which is the near infrared light emitted from the tip light emitting section 77 of the light-emitting pointing element 70, to thereby perform imaging. Imaging by the two cameras 310, 320 is performed in both of a first period, in which the irradiating detection light IDL emitted from the detection light irradiation section 410 is in an ON state (light-emitting state), and a second period in which the irradiating detection light IDL is in an OFF state (non-light-emitting state). By comparing the images in the respective two types of periods with each other, it is possible for the position detection section 600 to determine which one of the light-emitting pointing element 70 and the non-light-emitting pointing element 80 is each of the pointing elements included in the images.

The two cameras 310, 320 are each provided with a function of performing imaging using the light including the visible light in addition to a function of performing imaging using the light including the near infrared light. In this case, in the case of taking the image of the projected screen PS, which has been projected on the screen surface SS, using each of the cameras, the taken image includes the image projected on the projected screen PS. Therefore, as described later, it is possible to calculate a coordinate conversion coefficient for the position detection section 600 to convert the coordinate system in the taken image into the coordinate system in the projected screen. Further, for example, using the taken image, the projection image generation section 500 can perform the keystone distortion correction. Since the method of the keystone distortion correction using one or more cameras is well known, the explanation thereof will be omitted here.

The position detection section 600 has a function of analyzing the image (hereinafter also referred to as a "first taken image FI") taken by the first camera 310 to detect the two-dimensional coordinate position (hereinafter also referred to as a "first coordinate position $(X_f, Y_f)$") in the projected screen PS from the two-dimensional coordinate position (U, V) in the first taken image FI of the tip portion of the pointing element 780 (the light-emitting pointing element 70 or the non-light-emitting pointing element 80). The first coordinate position $(X_f, Y_f)$ is a position, at which the tip portion of the pointing element 780 has contact on the projected screen PS, and which corresponds to the two-dimensional coordinate position (U, V) of the tip portion of the pointing element 780, which has been shot when the pointing element 780 has contact with the projected screen PS (the screen surface SS), in the first taken image FI. Further, the position detection section 600 has a function of analyzing the image (hereinafter also referred to as a "second taken image SI") taken by the second camera 320 to detect the two-dimensional coordinate position (hereinafter also referred to as a "second coordinate position $(X_s, Y_s)$") in the projected screen PS from the two-dimensional coordinate position (ξ, η) in the second taken image SI of the tip portion of the pointing element 780. The second coordinate position $(X_s, Y_s)$ is a position, at which the tip portion of the pointing element 780 has contact on the projected screen PS, and which corresponds to the two-dimensional coordinate position (ξ, η) of the tip portion of the pointing element 780, which has been shot when the pointing element 780 has contact with the projected screen PS, in the second taken image SI. When detecting the first coordinate position in the projected screen PS using the first taken image FI, the position detection section 600 compares the first taken image in the first period and the first taken image in the second period described above with each other to thereby determine which one of the light-emitting pointing element 70 and the non-light-emitting pointing element 80 is each of the pointing elements 780 included in the first taken images. When detecting the second coordinate position in the projected screen PS using the second taken image SI, the position detection section 600 determines which one of the light-emitting pointing element 70 and the non-light-emitting pointing element 80 is each of the pointing elements 780 included in the second taken images SI using substantially the same method. The method of detecting the two-dimensional coordinate positions (the first coordinate position and the second coordinate position) of the pointing element 780 in the projected screen PS from the taken images (the first taken images FI and the second taken images SI) will be described later. Hereinafter, in the case of discriminating the first coordinate position of the tip portion 71 of the light-emitting pointing element 70 and the first coordinate position of the tip portion 81 of the non-light-emitting pointing element 80 from each other, the coordinate position of the light-emitting pointing element 70 is also referred to as the first coordinate position $(X_{f71}, Y_{f71})$, and the coordinate position of the non-light-emitting pointing element 80 is also referred to as the first coordinate position $(X_{f81}, Y_{f81})$. Similarly, with respect to the second coordinate positions, the coordinate position of the light-emitting pointing element 70 is also referred to as the second coordinate position $(X_{s71}, Y_{s71})$, and the coordinate position of the non-light-emitting pointing element 80 is also referred to as the second coordinate position $(X_{s81}, Y_{s81})$.

The contact detection section 800 detects the contact of the pointing element 780 (the light-emitting pointing element 70 or the non-light-emitting pointing element 80) with the projected screen PS (the screen surface SS). The contact detection section 800 according to the present embodiment performs the detection of the contact of the light-emitting pointing element 70 with the projected screen PS based on the light emission pattern of the pointing element signal light PSL emitted by the light-emitting pointing element 70, and performs the detection of the contact of the non-light-emitting pointing element 80 with the projected screen PS based on the first coordinate position $(X_{f81}, Y_{f81})$ and the second coordinate position $(X_{s81}, Y_{s81})$ of the non-light-emitting pointing element 80 detected by the position detection section 600. It should be noted that the contact detection section 800 can perform the detection of the contact of the light-emitting pointing element 70 with the projected screen PS using the same method as the detection method of the contact of the non-light-emitting pointing element 80 with the projected screen PS. The contact detection section 800 determines that the non-light-emitting pointing element 80 has contact with the projected screen PS in the case in which the first coordinate position $(X_{f81}, Y_{f81})$ and the second coordinate position $(X_{s81}, Y_{s81})$ of the non-light-emitting pointing element 80 coincide, or roughly coincide with each other. The expression that the first coordinate position and the second coordinate position "roughly coincide with each other" means the case in which the distance D1 between the first coordinate position and the second coordinate position becomes equal to or lower than a value set in advance as an error tolerance Th. The detection method of the contact of the non-light-emitting pointing element 80 by the contact detection section 800 will be described later in detail.

The light-emitting pointing element 70 is provided with a signal light reception section 74, a control section 75, a tip switch 76, and the tip light emitting section 77 besides the button switch 73. The signal light reception section 74 has a function of receiving a device signal light ASL emitted from the signal light transmission section 430 of the projector 100. The tip switch 76 is a switch to be set to an ON state when the tip portion 71 of the light-emitting pointing element 70 is pushed, and set to an OFF state when the tip portion 71 is released. The tip switch 76 is normally in the OFF state, and is set to the ON state when the tip portion 71 of the light-emitting pointing element 70 has contact with the screen surface SS due to the contact pressure thereof. When the tip switch 76 is in the OFF state, the control section 75 makes the tip light emitting section 77 emit light with a specific first light emission pattern representing that the tip switch 76 is in the OFF state to thereby emit the pointing element signal light PSL having the first light emission pattern. In contrast, when the tip switch 76 becomes in the ON state, the control section 75 makes the tip light emitting section 77 emit light with a specific second light emission pattern representing that the tip switch 76 is in the ON state to thereby emit the pointing element signal light PSL having the second light emission pattern. Since the first light emission pattern and the second light emission pattern are different from each other, it is possible for the position detection section 600 to analyze at least one of the first taken image and the second taken image to thereby determine whether the tip switch 76 is in the ON state or in the OFF state. Further, the contact detection section 800 can detect the contact of the light-emitting pointing element 70 with the projected screen PS based on the analysis result of the position detection section 600.

The button switch 73 of the light-emitting pointing element 70 has the same function as that of the tip switch 76. Therefore, the control section 75 makes the tip light emitting section 77 emit light with the second light emission pattern described above in the state in which the user holds down the button switch 73, and makes the tip light emitting section 77 emit light with the first light emission pattern described above in the state in which the button switch 73 is not held down. In other words, the control section 75 makes the tip light emitting section 77 emit light with the second light emission pattern described above in the state in which at least one of the tip switch 76 and the button switch 73 is in the ON state, and makes the tip light emitting section 77 emit light with the first light emission pattern described above in the state in which both of the tip switch 76 and the button switch 73 are in the OFF state.

It should be noted that it is also possible to arrange that a different function from that of the tip switch 76 is assigned to the button switch 73. For example, in the case in which the same function as that of a right-click button of the mouse is assigned to the button switch 73, when the user holds down the button switch 73, an instruction of the right click is transmitted to the control section 700 of the projector 100, and the process corresponding to the instruction is executed. In the case in which the different function from that of the tip switch 76 is assigned to the button switch 73 as described above, the tip light emitting section 77 emits light with four light emission patterns different from each other in accordance with the ON/OFF state of the tip switch 76 and the ON/OFF state of the button switch 73. In this case, it is possible for the light-emitting pointing element 70 to make transmission to the projector 100 while distinguishing the four combinations of the ON/OFF states of the tip switch 76 and the button switch 73 from one another.

Figures 4A, 4B:
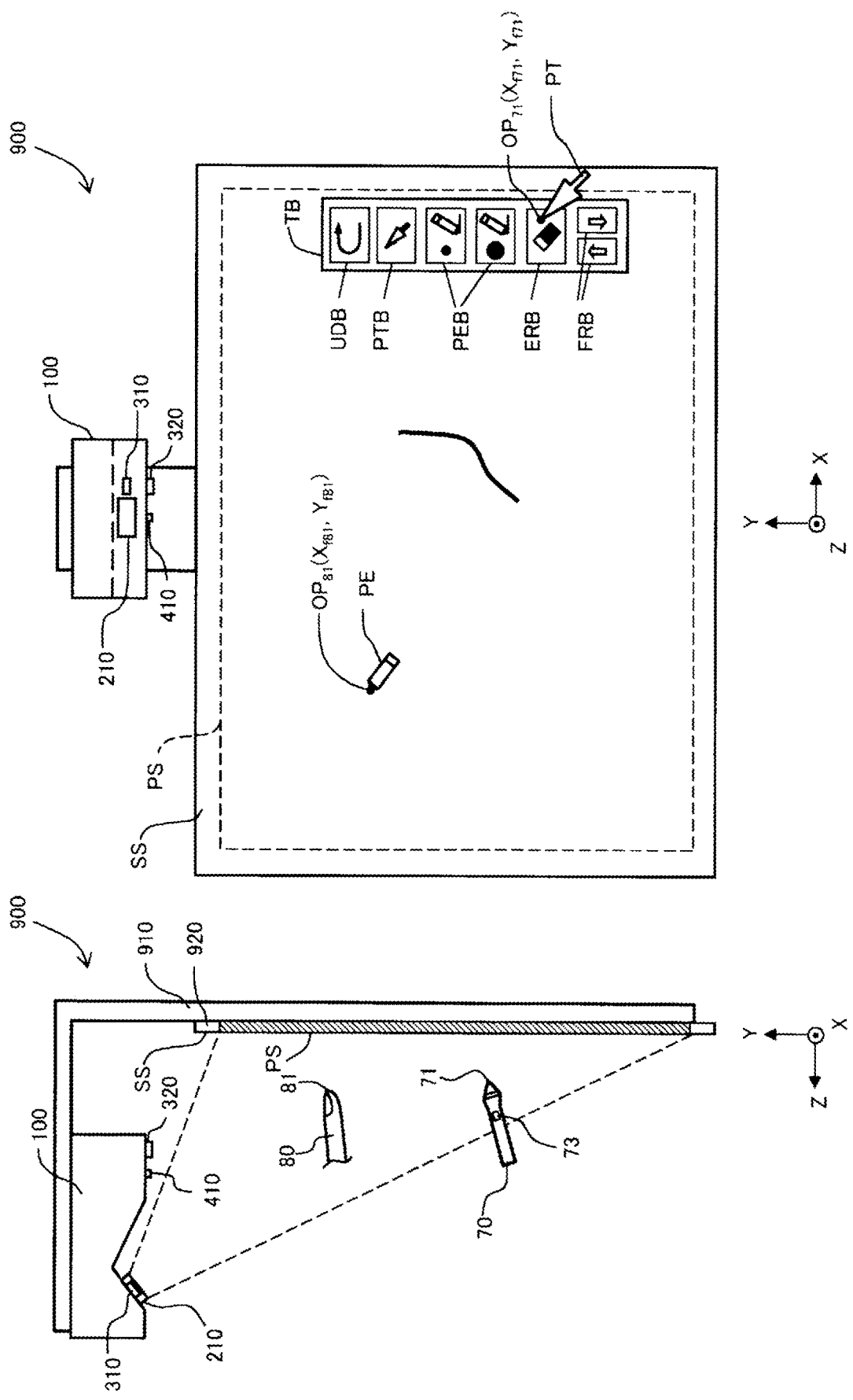
FIGS. 4A and 4B are explanatory diagrams showing an appearance of an operation using the light-emitting pointing element and a non-light-emitting pointing element.

FIGS. 4A and 4B are explanatory diagrams showing an appearance of an operation using the light-emitting pointing element 70 and the non-light-emitting pointing element 80. In this example, both of the tip portion 71 of the light-emitting pointing element 70 and the tip portion 81 of the non-light-emitting pointing element 80 are separated from the screen surface SS. The first coordinate position $(X_{f71}, Y_{f71})$ of the tip portion 71 of the light-emitting pointing element 70 on the projected screen PS corresponds to the above of the eraser button ERB of the toolbox TB. Further, here, the mouse pointer PT is selected as a tool for representing the function of the tip portion 71 of the light-emitting pointing element 70, and the mouse pointer PT is drawn in the projected screen PS so that the tip $OP_{71}$ of the mouse pointer PT exists on the eraser button ERB. As described above, as the two-dimensional coordinate position of the tip portion 71 of the light-emitting pointing element 70 on the projected screen PS, there are determined the two coordinates, namely the first coordinate position $(X_{f71}, Y_{f71})$ and the second coordinate position $(X_{s71}, Y_{s71})$. Here, the first coordinate position out of the two coordinates is visually displayed as the position of the tip portion 71 of the light-emitting pointing element 70 on the projected screen PS, and the second coordinate position is not displayed. Therefore, on the projected screen PS, the mouse pointer PT is drawn so that an operation point $OP_{71}$ located at the tip of the mouse pointer PT is disposed at the first coordinate position $(X_{f71}, Y_{f71})$ on the projected screen PS. In other words, the tip $OP_{71}$ of the mouse pointer PT is disposed at the first coordinate position of the tip portion 71 of the light-emitting pointing element 70, and the instruction of the user is performed at this position. For example, it is possible for the user to select the eraser tool by making the tip portion 71 of the light-emitting pointing element 70 have contact with the surface of the projected screen PS. Further, it is also possible for the user to select the eraser tool by holding down the button switch 73 of the light-emitting pointing element 70 in this state. As described above, in the present embodiment, even in the case in which the light-emitting pointing element 70 is in the state of being separated from the screen surface SS, it is possible to provide the instruction, which corresponds to the content of the projected screen PS in the operation point $OP_{71}$ located at the first coordinate position $(X_{f71}, Y_{f71})$ of the tip portion 71, to the projector 100 by holding down the button switch 73. It should be noted that as another embodiment, it is also possible to adopt the configuration in which the second coordinate position $(X_{s71}, Y_{s71})$ of the tip portion 71 is visually displayed as the position of the tip portion 71 of the light-emitting pointing element 70 on the projected screen PS, and the first coordinate position $(X_{f71}, Y_{f71})$ of the tip portion 71 is not displayed. In this case, the operation point $OP_{71}$ is disposed at the second coordinate position $(X_{s71}, Y_{s71})$ of the tip portion 71 of the light-emitting pointing element 70. It should be noted that as the position on the projected screen PS of the tip portion 71 of the light-emitting pointing element 70, the first coordinate position is more preferably displayed in a visual manner than the second coordinate position. The reason is as follows. The first camera 310 is located at a position further from the screen surface SS in the Z direction than the second camera. Therefore, the displacement between the position, on the projected screen, of the pointing element 780 not having contact with the projected screen viewed from the Z direction and the first coordinate position is smaller than the displacement between that position and the second coordinate position. It should be noted that as still another embodiment, there can be adopted a configuration in which an average (middle) position $((X_{f71}+X_{s71})/2, (Y_{f71}+Y_{s71})/2)$ between the first coordinate position and the second coordinate position of the tip portion 71 is visually displayed as the position, on the projected screen PS, of the tip portion 71 of the light-emitting pointing element 70, but the first coordinate position and the second coordinate position of the tip portion 71 are not displayed.

In FIG. 4B, the pen tool PE is further selected as the tool representing the function of the tip portion 81 of the non-light-emitting pointing element 80, and the pen tool PE is drawn on the projected screen PS. As described above, as the two-dimensional coordinate position of the tip portion 81 of the non-light-emitting pointing element 80 on the projected screen PS, there are determined the two coordinates, namely the first coordinate position $(X_{f81}, Y_{f81})$ and the second coordinate position $(X_{s81}, Y_{s81})$. Here, similarly to the light-emitting pointing element 70, the first coordinate position is visually displayed as the position of the tip portion 81 of the non-light-emitting pointing element 80 on the projected screen PS, and the second coordinate position is not displayed. Therefore, on the projected screen PS, the pen tool PE is drawn so that an operation point $OP_{81}$ located at the tip of the pen tool PE is disposed at the first coordinate position $(X_{f81}, Y_{f81})$ on the projected screen PS. It should be noted that when the user provides the instruction to the projector 100 using the non-light-emitting pointing element 80, the instruction (e.g., drawing and selection of the tool) is performed in the state of making the tip portion 81 of the non-light-emitting pointing element 80 have contact with the projected screen PS. In the example shown in FIGS. 4A and 4B, even in the case in which the tip portions of the pointing elements 780 (the light-emitting pointing element 70 and the non-light-emitting pointing element 80) are separated from the projected screen PS, the tool (the mouse pointer PT or the pen tool PE) selected by each of the pointing elements is drawn on the projected screen PS to thereby be displayed. Therefore, there is an advantage that it is easy to understand what tools are selected by the pointing elements even in the case in which the user does not make the tip portions of the pointing elements have contact with the projected screen PS, and thus, the operation is easy.

It should be noted that the interactive projection system 900 is configured so that two or more light-emitting pointing elements 70 can simultaneously be used. In this case, the light emission patterns of the pointing element signal light PSL described above are preferably unique light emission patterns with which the two or more light-emitting pointing elements 70 can be identified. More specifically, in the case in which the N (N is an integer equal to or greater than 2) light-emitting pointing elements 70 can be used at the same time, the light emission patterns of the pointing element signal light PSL are preferably the patterns with which the N light-emitting pointing elements 70 can be distinguished from one another. It should be noted that in the case in which a plurality of unit light emission periods is included in a set of light emission patterns, two values, namely emission and non-emission, can be expressed in each of the unit light emission periods. Here, each of the unit light emission periods corresponds to the period for expressing 1-bit information, namely the ON/OFF state of the tip light emitting section 77 of the light-emitting pointing element 70. In the case in which the set of light emission patterns are each formed of M (M is an integer equal to or greater than 2) unit light emission periods, $2^M$ states can be distinguished by the set of light emission patterns. Therefore, it is preferable for the number M of the unit light emission periods constituting each of the set of light emission patterns to be set so as to fulfill the formula (1) below.

$$N \times Q \leq 2^M \quad (1)$$

Here, Q denotes the number of the states distinguished by the switches 73, 76 of the light-emitting pointing element 70, and in the example of the present embodiment, Q=2 or Q=4 is set. For example, in the case of Q=4, it is preferable that M is set to an integer equal to or greater than 3 if N is 2, and M is set to an integer equal to or greater than 4 if N is 3 through 4. In this case, when the position detection section 600 (or the control section 700) identifies the N light-emitting pointing elements 70, and the states of the switches 73, 76 of each of the light-emitting pointing elements 70, the identification is performed using the M images taken by each of the cameras 310, 320 in the M unit light emission periods of the set of light emission patterns. It should be noted that the M-bit light emission patterns are the patterns of setting the pointing element signal light PSL to the ON state or the OFF state in the state of keeping the irradiating detection light IDL in the OFF state, and therefore the non-light-emitting pointing element 80 does not show in the images taken by the cameras 310, 320. Therefore, in order to take images to be used for detecting the position of the non-light-emitting pointing element 80, it is preferable to further add a 1-bit unit light emission period with the irradiating detection light IDL set to the ON state. It should be noted that in the unit light emission period for the position detection, the pointing element signal light PSL can be in either of the ON state and the OFF state. The images obtained in the unit light emission period for the position detection can also be used for the position detection of the light-emitting pointing elements 70.

The five specific examples of the signal light described in FIG. 3 are summed up as follows.

(1) Projection Image Light IML: the image light (visible light) projected on the screen surface SS by the projection lens 210 in order to project the projected screen PS on the screen surface SS.

(2) Irradiating Detection Light IDL: the near infrared light with which the detection light irradiation section 410 irradiates throughout the screen surface SS and the space in front of the screen surface SS for detecting the tip portions of the pointing elements 780 (the light-emitting pointing element 70 and the non-light-emitting pointing element 80).

(3) Reflected Detection Light RDL: the near infrared light reflected by the pointing elements 780 (the light-emitting pointing element 70 and the non-light-emitting pointing element 80), and then received by the two cameras 310, 320 out of the near infrared light having been emitted as the irradiating detection light IDL.

(4) Device Signal Light ASL: the near infrared light periodically emitted from the signal light transmission section 430 of the projector 100 in order to synchronize the projector 100 and the light-emitting pointing element 70 with each other.

(5) Pointing Element Signal Light PSL: the near infrared light emitted from the tip light emitting section 77 of the light-emitting pointing element 70 at the timing synchronized with the device signal light ASL. The light emission pattern of the pointing element signal light PSL is changed in accordance with the ON/OFF states of the switches 73, 76 of the light-emitting pointing element 70. Further, the unique light emission patterns for identifying the plurality of light-emitting pointing elements 70 are provided.

In the present embodiment, the position detection of the tip portions of the light-emitting pointing element 70 and the non-light-emitting pointing element 80, and the determination of the contents instructed by the light-emitting pointing element 70 and the non-light-emitting pointing element 80 are respectively performed as follows.

A2. General Description of Position Detection Method of Non-Light-Emitting Pointing Element 80 and Determination Method of Instruction Content FIGS. 5A through 5C, and 6A through 6C are diagrams showing an example of a correspondence relationship between the coordinate positions of the taken images FI, SI and the coordinate positions of the projected screen PS. FIGS. 5A and 6A correspond to the first taken image FI, FIGS. 5B and 6B correspond to the projected screen PS, and FIGS. 5C and 6C correspond to the second taken image SI. FIGS. 5A through 5C show the state in which the tip portion 81 of the non-light-emitting pointing element 80 is separated from the screen surface SS, and FIGS. 6A through 6C show the state in which the tip portion 81 has contact with the screen surface SS. As shown in FIGS. 5A, 5B, 6A, and 6B, the position detection section 600 calculates the first coordinate position $(X_{f81}, Y_{f81})$ of the tip portion 81 of the non-light-emitting pointing element 80 in the projected screen PS using the two-dimensional coordinate position $(U_{81}, V_{81})$ of the tip portion 81 in the first taken image FI and the first coordinate conversion coefficient CF. The "first coordinate conversion coefficient CF" is a coefficient for converting the "first camera coordinate (U, V)" as the coordinate system of the first taken image FI into the "projected screen coordinate (X, Y)" as the coordinate system of the projected screen PS, and is calculated using a method described later. It should be noted that since the "projected screen coordinate (X, Y)" corresponds to the "panel coordinate (x, y)" as the coordinate system of the liquid crystal panel 220, the first coordinate conversion coefficient CF can also be the coefficient for converting the "first camera coordinate (U, V)" into the "panel coordinate (x, y)." The position detection section 600 can recognize whether or not the pointing element 780 included in the first taken image FI is the non-light-emitting pointing element 80 by determining whether or not the light emission pattern of the light-emitting pointing element 70 appears in the first taken images FI taken at a predetermined plurality of timings. It should be noted that in the detection of the tip portion 81 of the non-light-emitting pointing element 80 in the first taken image FI, identification can be achieved using a well known technology such as template matching or feature extraction. For example, in the case of recognizing the tip portion 81 of the non-light-emitting pointing element 80 as a finger using the template matching, the tip portion 81 of the finger can be recognized by preparing a plurality of templates related to the finger in advance, and then searching the first taken image FI for the part matching these templates. As shown in FIGS. 5B, 5C, 6B, and 6C, the position detection section 600 calculates the second coordinate position $(X_{s81}, Y_{s81})$ of the tip portion 81 of the non-light-emitting pointing element 80 in the projected screen PS using the two-dimensional coordinate position $(\xi_{81}, \eta_{81})$ of the tip portion 81 in the second taken image SI and the second coordinate conversion coefficient CS. The "second coordinate conversion coefficient CS" is a coefficient for converting the "second camera coordinate $(\xi, \eta)$" as the coordinate system of the second taken image SI into the "projected screen coordinate (X, Y)" described above, and is calculated using a method described later. It should be noted that the second coordinate conversion coefficient CS can be a coefficient for converting the "second camera coordinate $(\xi, \eta)$" into the "panel coordinate (x, y)." As shown in FIGS. 5A through 5C and 6A through 6C, in the case in which the tip portion 81 of the non-light-emitting pointing element 80 is separated from the screen surface SS (FIGS. 5A through 5C), the first coordinate position $(X_{f81}, Y_{f81})$ and the second coordinate position $(X_{s81}, Y_{s81})$ of the tip portion 81 in the projected screen PS are different from each other, and in the case in which the tip portion 81 has contact with the screen surface SS (FIGS. 6A through 6C), the first coordinate position $(X_{f81}, Y_{f81})$ and the second coordinate position $(X_{s81}, Y_{s81})$ of the tip portion 81 roughly coincide with each other. Therefore, the contact detection section 800 detects the fact that the tip portion 81 has contact with the projection screen surface SS in the case in which the first coordinate position $(X_{f81}, Y_{f81})$ and the second coordinate position $(X_{s81}, Y_{s81})$ of the tip portion 81 roughly coincide with each other.

FIGS. 7A and 7B are diagrams showing an example of the state (FIG. 7A) in which the tip portion 81 of the non-light-emitting pointing element 80 is separated from the screen surface SS and the state (FIG. 7B) in which the tip portion 81 has contact with screen surface SS. The contact detection section 800 according to the present embodiment determines whether or not the tip portion 81 of the non-light-emitting pointing element 80 has contact with the screen surface SS based on whether or not the distance D1 between the first coordinate position $(X_{f81}, Y_{f81})$ and the second coordinate position $(X_{s81}, Y_{s81})$ of the tip portion 81 in the projected screen PS is equal to or shorter than an allowable tolerance Th. As the allowable tolerance Th, it is preferable to use a small value in a range of, for example, about 1 mm through 10 mm. As shown in FIG. 7A, in the case in which the non-light-emitting pointing element 80 is separated from the screen surface SS, the first coordinate position $(X_{f81}, Y_{f81})$ and the second coordinate position $(X_{s81}, Y_{s81})$ are different from each other (D1>Th) in the projected screen PS. The first coordinate position $(X_{f81}, Y_{f81})$ corresponds to the coordinate position of the intersection between the straight line connecting the first camera 310 and the tip portion 81 of the non-light-emitting pointing element 80 to each other and the screen surface SS, and the second coordinate position $(X_{s81}, Y_{s81})$ corresponds to the coordinate position of the intersection between the straight line connecting the second camera 320 and the tip portion 81 to each other and the screen surface SS. Therefore, the tip portion 81 seems to have contact with the screen surface SS at a position different between the case of viewing the tip portion 81 from the first camera 310 and the case of viewing the tip portion 81 from the second camera 320 if the tip portion 81 of the non-light-emitting pointing element 80 is separated from the screen surface SS. In contrast, as shown in FIG. 7B, in the case in which the tip portion 81 of the non-light-emitting pointing element 80 has contact with the screen surface SS, the first coordinate position $(X_{f81}, Y_{f81})$ and the second coordinate position $(X_{s81}, Y_{s81})$ roughly coincide with each other (D1≤Th) in the projected screen PS. This is because if the tip portion 81 of the non-light-emitting pointing element 80 has contact with the screen surface SS, the straight line connecting the first camera 310 and the tip portion 81 of the non-light-emitting pointing element 80 and the straight line connecting the second camera 320 and the tip portion 81 intersect with each other nearly on the screen surface SS. Therefore, whether or not the tip portion 81 of the non-light-emitting pointing element 80 has contact with the screen surface SS can easily be detected based on whether or not the first coordinate position $(X_{f81}, Y_{f81})$ and the second coordinate position $(X_{s81}, Y_{s81})$ of the tip portion 81 coincide with each other within the allowable tolerance. It should be noted that the allowable tolerance can experimentally or empirically be determined in advance.

In the case in which the contact detection section 800 determines that the tip portion 81 of the non-light-emitting pointing element 80 has contact with the screen surface SS, the control section 700 determines the instruction content in accordance with the content of the projection screen surface SS at the contact position. Further, it is also possible for the control section 700 to make the projection image generation section 500 draw a pointer or a mark selected in advance so that the pointer or the mark is disposed at the first coordinate position $(X_{f81}, Y_{f81})$ in the projected screen PS using the first coordinate position $(X_{f81}, Y_{f81})$ of the tip portion 81 of the non-light-emitting pointing element 80 in the projected screen PS detected by the position detection section 600. Further, it is also possible for the control section 700 to perform the process corresponding to the content instructed with the non-light-emitting pointing element 80, and then makes the projection image generation section 500 draw the image including the processing result.

A3. General Description of Position Detection Method of Light-Emitting Pointing Element 70 and Determination Method of Instruction Content The position detection section 600 calculates the first coordinate position $(X_{f71}, Y_{f71})$ of the tip portion 71 of the light-emitting pointing element 70 in the projected screen PS using the two-dimensional coordinate position ($U_{71}$, $V_{71}$) of the tip portion 71 in the first taken image FI and the first coordinate conversion coefficient CF. The position detection section 600 can recognize whether or not the pointing element 780 included in the first taken image FI is the light-emitting pointing element 70 by determining whether or not the light emission pattern of the light-emitting pointing element 70 appears in the first taken images FI taken at a predetermined plurality of timings. The contact detection section 800 can determine whether or not the tip portion 71 of the light-emitting pointing element 70 has contact with the screen surface SS (i.e., whether or not the tip switch 76 is in the ON state) can be determined using the light emission pattern of the tip light emitting section 77 in the first taken images FI taken at the plurality of timings described above. The first coordinate position ($X_{f71}$, $Y_{f71}$) of the tip portion 71 of the light-emitting pointing element 70 on the projected screen PS, and the contact of the tip portion 71 with the screen surface SS can be detected by the position detection section 600 and the contact detection section 800.

The control section 700 determines the instruction content by the light-emitting pointing elements 70 based on the detection results of the position detection section 600 and the contact detection section 800, then makes the projection image generation section 500 generate the image corresponding to the instruction content, and then makes the projection section 200 project the image corresponding to the instruction content on the screen surface SS. For example, as shown in FIG. 4B as an example, in the case in which the tip switch 76 becomes in the ON state in the state in which the first coordinate position ($X_{f71}$, $Y_{f71}$) of the tip portion 71 is located on either of the buttons in the toolbox TB, the tool of that button is selected. Further, as shown in FIG. 2B as an example, in the case in which the tip switch 76 turns to the ON state in the state in which the first coordinate position ($X_{f71}$, $Y_{f71}$) of the tip portion 71 is located at a position outside the toolbox TB in the projected screen PS, the process (e.g., drawing) using the tool thus selected is selected. The control section 700 makes the projection image generation section 500 draw a pointer or a mark selected in advance so that the pointer or the mark is disposed at the first coordinate position ($X_{f71}$, $Y_{f71}$) in the projected screen PS using the first coordinate position ($X_{f71}$, $Y_{f71}$) of the tip portion 71 of the light-emitting pointing element 70. Further, the control section 700 performs the process corresponding to the content instructed with the light-emitting pointing element 70, and then makes the projection image generation section 500 draw the image including the processing result.

A4. Calculation of Coordinate Conversion Coefficients CF, CS

Figures 8A, 8B, 8C:
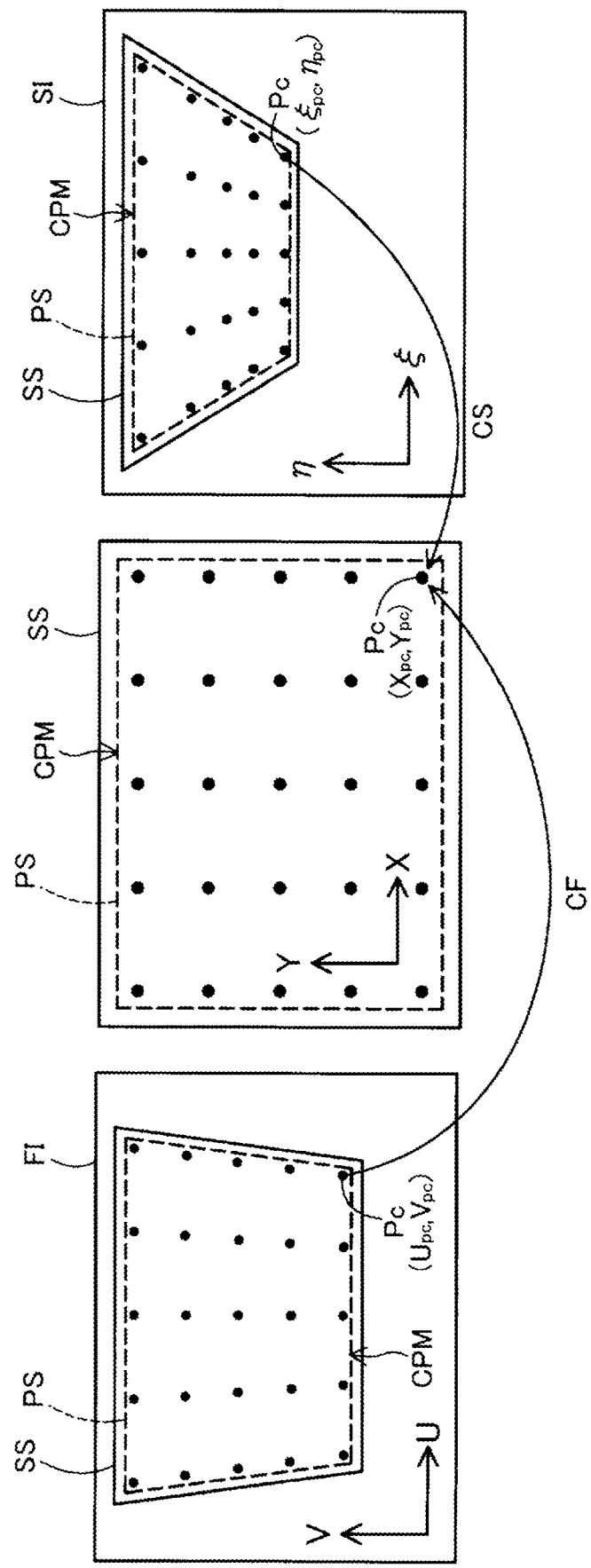
FIGS. 8A through 8C are diagrams showing an example of the projected screen on which a measuring pattern image is displayed and the taken image.

FIGS. 8A through 8C are diagrams showing an example of the projected screen PS on which the measuring pattern image CPM, which is used for the calculation of the first coordinate conversion coefficient CF and the second coordinate conversion coefficient CS, is displayed, and the taken images FI, SI each including the projected screen PS. FIG. 8A corresponds to the first taken image FI, FIG. 8B corresponds to the projected screen PS, and FIG. 8C corresponds to the second taken image SI. Firstly, the projection section 200 projects the projected screen PS, on which the measuring pattern image CPM (a calibration pattern image) is displayed, on the projection screen surface SS at the time of the startup of the projector 100. The measuring pattern image CPM is an image including a plurality of reference points Pc, and has previously been stored in the storage section not shown as measuring pattern image data. In the present embodiment, the measuring pattern image CPM has the 25 reference points Pc arranged in a 5×5 matrix. The number P of the reference points Pc included in the measuring pattern image CPM is not limited to the number described above providing P≥3 is fulfilled. It should be noted that it is preferable for the reference points Pc to be regularly arranged in a matrix in the measuring pattern image CPM. Further, the reference point Pc is not limited to a dot providing there is adopted the configuration in which a specific position on the projected screen PS can be identified, and can also be, for example, an intersection between two straight lines, or a corner portion of a rectangle.

When the projected screen PS, on which the measuring pattern image CPM is displayed, is projected on the projection screen surface SS, the imaging section 300 takes the image of the area including the projected screen PS on which the measuring pattern image CPM is displayed using the two cameras 310, 320. Thus, the first taken image FI and the second taken image SI each including the measuring pattern image CPM can be obtained. The position detection section 600 analyzes each of the taken images (the first taken image FI and the second taken image SI) thus obtained to detect the coordinate position of each of the reference points Pc in the taken images. Specifically, the position detection section 600 analyzes the first taken image FI to detect the coordinate position ($U_{pc}$, $V_{pc}$) of each of the reference points Pc in the first camera coordinate system, and analyzes the second taken image SI to detect the coordinate position ($\xi_{pc}$, $\eta_{pc}$) of each of the reference points Pc in the second camera coordinate system. When the position detection section 600 has detected these coordinate positions, the position detection section 600 calculates the first coordinate conversion coefficient CF based on the coordinate position ($X_{pc}$, $Y_{pc}$) of each of the reference points Pc in the projected screen coordinate system and the coordinate position ($U_{pc}$, $V_{pc}$) in the first camera coordinate system thus detected. Further, the position detection section 600 calculates the second coordinate conversion coefficient CS based on the coordinate position ($X_{pc}$, $Y_{pc}$) of each of the reference points Pc in the projected screen coordinate system and the coordinate position ($\xi_{pc}$, $\eta_{pc}$) of each of the reference points Pc in the second camera coordinate system. The coordinate position ($U_{780}$, $V_{780}$) of the pointing element 780 in the first camera coordinate system and the coordinate position ($X_{f780}$, $Y_{f780}$) of the pointing element 780 in the projected screen coordinate system in the case in which the pointing element 780 has contact with the projected screen PS are made to correspond to each other using the first coordinate conversion coefficient CF. Further, the coordinate position ($\xi_{780}$, $\eta_{780}$) of the pointing element 780 in the second camera coordinate system and the coordinate position ($X_{s780}$, $Y_{s780}$) of the pointing element 780 in the projected screen coordinate system in the case in which the pointing element 780 has contact with the projected screen PS are made to correspond to each other using the second coordinate conversion coefficient CS. The "first coordinate conversion coefficient CF" corresponds to "first correspondence data" in the appended claims, and the "second coordinate conversion coefficient CS" corresponds to "second correspondence data" in the appended claims. The coordinate position ($X_{pc}$, $Y_{pc}$) of each of the reference points Pc in the projected screen coordinate system corresponds to the coordinate position ($x_{pc}$, $y_{pc}$) of the reference point Pc of the measuring pattern image CPM in the liquid crystal panel 220, and can be set in advance as a known value.

According to the interactive projector 100 related to the present embodiment explained hereinabove, the first coordinate position and the second coordinate position of the pointing element 780 on the projected screen PS are detected using the two types of taken images FI, SI including the pointing element 780. Since the detection of the contact of the pointing element 780 with the projected screen PS is performed based on whether or not the first coordinate position and the second coordinate position roughly coincide with each other, the detection processing on whether or not the pointing element 780 has contact with the screen surface SS can easily be performed using an alternative method. Further, speeding up of the detection process can be achieved. For example, according to the present embodiment, it is not necessary to calculate the three-dimensional position of the pointing element 780 by the three-dimensional measurement using a plurality of cameras in order to perform the detection on whether or not the pointing element 780 has contact with the screen surface SS. Therefore, a loss of time in calculating the three-dimensional position can be suppressed, and thus the speeding up of the detection process can be achieved.

B. Modified Examples

It should be noted that the invention is not limited to the specific examples and the embodiments described above, but can be implemented as various forms within the scope or the spirit of the invention, and the following modifications, for example, are also possible.

Modified Example 1

Although in the embodiment described above, it is assumed that the imaging section 300 includes the two cameras 310, 320, the imaging section 300 can also include three or more cameras. In the latter case, the determination on whether or not the tip portion 81 of the non-light-emitting pointing element 80 has contact with the screen surface SS can be performed based on m (m is an integer equal to or greater than 3) images taken by the m cameras. For example, it is possible to obtain the two-dimensional position coordinate $(X_{81}, Y_{81})$ of the tip portion 81 in the projected screen PS using $_mC_2$ combinations obtained by arbitrarily selecting two images out of the m images, and then determine whether or not the tip portion 81 of the non-light-emitting pointing element 80 has contact with the screen surface SS using the average value of the distances between the two-dimensional position coordinates. By adopting this configuration, the detection accuracy of the contact can further be improved.

Modified Example 2

Although in the embodiments described above, it is assumed that the interactive projection system 900 can act in the whiteboard mode and the PC interactive mode, the system can also be configured so as to act in either one of the modes. Further, it is also possible for the interactive projection system 900 to be configured so as to act only in other modes than these two modes, or further to be configured so as to be able to act in a plurality of modes including these two modes.

Modified Example 3

Although in the embodiments described above it is assumed that the irradiating detection light IDL, the reflected detection light RDL, the device signal light ASL, and the pointing element signal light PSL shown in FIG. 3 are all the near infrared light, it is also possible to assume that some or all of these types of light are light other than the near infrared light.

Modified Example 4

In the embodiments described above, the contact detection of the light-emitting pointing element 70 is performed based on the light emission pattern of the pointing element signal light PSL emitted by the light-emitting pointing element 70. However, similarly to the non-light-emitting pointing element 80, it is also possible to calculate the first coordinate position $(X_{f71}, Y_{f71})$ and the second coordinate position $(X_{s71}, Y_{s71})$ of the tip portion 71 of the light-emitting pointing element 70 in the projected screen PS to perform the contact detection of the tip portion 71 of the light-emitting pointing element 70 with the projected screen PS based on whether or not these coordinate positions coincide with each other within the allowable tolerance.

Although the embodiments of the invention are hereinabove explained based on some specific examples, the embodiments of the invention described above are only for making it easy to understand the invention, but not for limiting the scope of the invention. It is obvious that the invention can be modified or improved without departing from the scope of the invention and the appended claims, and that the invention includes the equivalents thereof.

What is claimed is:

1. A method of controlling an interactive projector capable of receiving an instruction of a user to a projected screen with a pointing element, the method comprising:
   projecting the projected screen on a screen surface;
   taking an image of an area of the projected screen with a plurality of cameras including a first camera that faces the screen surface at a first angle relative to a direction perpendicular to the screen surface and a second camera that faces the screen surface at a second angle relative to the direction perpendicular to the screen surface that is different from the first angle;
   calculating a first camera coordinate that is a position of the pointing element in a first coordinate system of the first taken image;
   calculating a second camera coordinate that is a position of the pointing element in a second coordinate system of the second taken image;
   detecting a first coordinate position of the pointing element on the projected screen based on a first taken image including the pointing element taken by the first camera by converting the first camera coordinate into a projected screen coordinate system using a first conversion coefficient, and detecting a second coordinate position of the pointing element on the projected screen based on a second taken image including the pointing element taken by the second camera by converting the second camera coordinate into the projected screen coordinate system using a second conversion coefficient;
   detecting that the pointing element is in contact with the projected screen when a distance between the first coordinate position and the second coordinate position in the projected screen coordinate system is within a defined tolerance and detecting that the pointing element is not in contact with the projected screen when the distance between the first coordinate position and the second coordinate position in the projected screen coordinate system is not within the defined tolerance, the defined tolerance being greater than zero;

irradiating the screen surface and a space in front of the screen surface with irradiating detection light during a first period;

taking first images of the area of the projected screen with the first camera and the second camera during the first period when the irradiating detection light is turned on;

taking second images of the area of the projected screen with the first camera and the second camera during a second period when the irradiating detection light is turned off;

detecting, in the first images and second images, reflected detection light, which is irradiating detection light that is reflected by a non-light-emitting pointing element;

detecting, in the first images and second images, pointing element signal light, which is light emitted from a tip light emitting section of a light-emitting pointing element; and comparing the first images to the second images to determine which one of the light-emitting pointing element and the non-light-emitting pointing element is each of a plurality of pointing elements included in the first images and second images.

2. The method according to claim 1, wherein the first coordinate position from the first taken image is detected using first correspondence data having a two-dimensional coordinate position of the pointing element in the first taken image and a two-dimensional coordinate position of the pointing element on the projected screen that are made to correspond to each other in a case in which the pointing element has contact with the projected screen, and the second coordinate position from the second taken image is detected using second correspondence data having a two-dimensional coordinate position of the pointing element in the second taken image and a two-dimensional coordinate position of the pointing element on the projected screen that are made to correspond to each other in the case in which the pointing element has contact with the projected screen.

3. The method according to claim 1, wherein the first coordinate position is a coordinate position of an intersection between a straight line connecting the first camera and the pointing element to each other and the projected screen, and the second coordinate position is a coordinate position of an intersection between a straight line connecting the second camera and the pointing element to each other and the projected screen.

4. The method according to claim 1, wherein the first camera is positioned at a first distance from the screen surface, the second camera is positioned at a second distance from the screen surface, and the first distance is greater than the second distance.

* * * * *